Nov. 16, 1965      W. H. MELTON      3,217,531
VIBRATION TABLE SUPPORTED ON FLUID FILM
Filed Sept. 27, 1957
FIG. 1
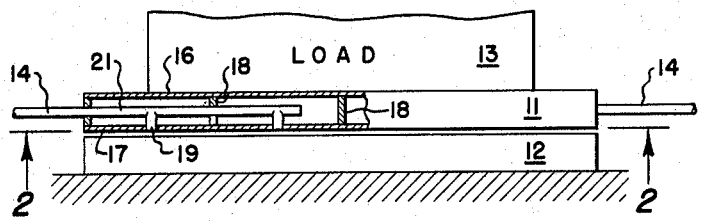
FIG. 2
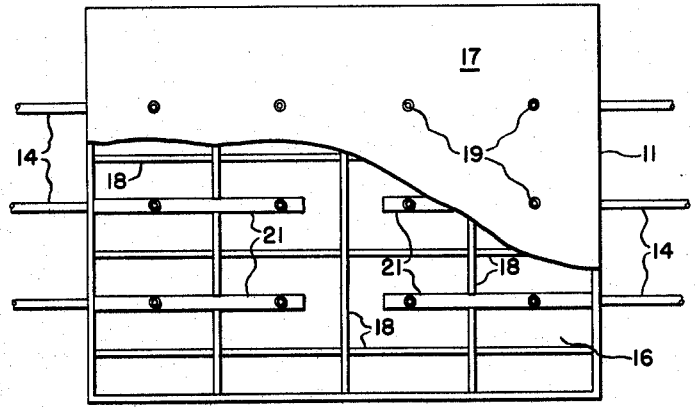
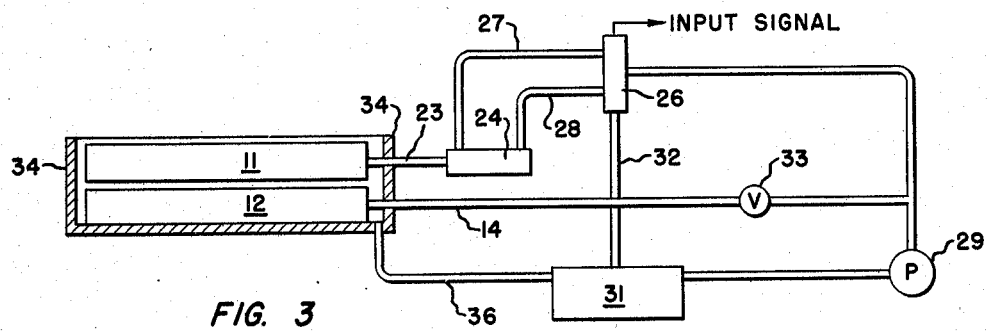
FIG. 3
INVENTOR.
WILLARD H. MELTON
BY
ATTORNEY

United States Patent Office 3,217,531
Patented Nov. 16, 1965

3,217,531
VIBRATION TABLE SUPPORTED ON FLUID FILM
Willard H. Melton, Pomona, Calif., assignor to General Dynamics Corporation (Convair Division), San Diego, Calif., a corporation of Delaware
Filed Sept. 27, 1957, Ser. No. 686,747
15 Claims. (Cl. 73—71.6)

This invention relates to vibration tables and more particularly to a vibration table wherein the oscillating member thereof is suspended on a fluid film.

Vibration tables heretobefore have used an oscillating member, upon which the test part is mounted, to impart the desired vibration thereto. In some tables this member rides on a trackway or rolls over a fixed base surface. Ball bearings, roller bearings and other means have been used to reduce friction between the fixed and moving parts. These methods of reducing friction however have not been entirely satisfactory, particularly when the test load is heavy as the excessive weight sometimes binds the rollers, or they tend to brinell and become out-of-round. This adds to the ever present lag in response of the table to the input signals as well as reducing the overall efficiency of the table. In other tables where the oscillating member is attached in some manner to framework comprising the supporting structures, under certain applied frequencies these structures become resonant, nullifying tests.

The film supported vibration table comprising the present invention includes a fixed base member over which a movable member is oscillated. This last member is moved the desired direction, length and frequency in a conventional manner in accordance with its design and the operator's wishes. A plurality of openings in the adjacent contacting surfaces of the fixed base member and/or movable member are connected to a source of fluid under low pressure. As the fluid is forced between the two members, the upper movable member is lifted above the lower member by hydraulic action of the fluid. The fluid then escapes from the outer edge of the members but in doing so has provided a protective film between the members upon which the upper member rests. Without contact between the relatively moving members, friction is substantially eliminated, reducing wear and providing greater linearity between the force actuating the movable member and the response of that member to the force. Since the oscillating member is free of a supporting structure it is consequently not subject to the effects of resonant frequencies under vibration.

It is therefore an object of the present invention to provide for a vibration table wherein there is no contact during vibration between the table's movable load supporting member and its fixed base member upon which the movable member rests when not in operation.

Another object is the provision of a vibration table wherein greater linearity of response is achieved by substantial elimination of friction between the movable load supporting member and the base member.

Another object is the provision of a vibration table wherein the load supporting member is free of its supporting structure and not subject to resonant frequencies thereof under vibration.

Another object is the provision of a pressurized fluid flow between a pair of stacked members to thereby provide a fluid film therebetween.

Another object is the provision of a fluid film between contacting members to permit relative movement therebetween substantially without friction or wear of parts.

Another object is the provision of hydraulic lift means for spacing a pair of stacked members during relative movement therebetween and without impairing said movement.

Other objects and features of the present invention will be readily apparent to those skilled in the art from the following specification and appended drawings wherein is illustrated a preferred form of the invention, and in which:

FIGURE 1 is a side elevational view of one embodiment with parts broken away,
FIGURE 2 is a sectional view taken along line 2—2 of FIGURE 1 with parts broken away, and
FIGURE 3 is a symbolic view of a modification.

Shaker or vibration tables are used extensively in testing the reliability and operability of electrical, mechanical and other types of components which will later be used in this type of environment. The length of linear movement, the frequency of movement, or the type or direction of movement of the moving platform is largely a matter of design and tables can readily be fabricated to perform with conventional desirable characteristics. The moving platform retains the load being tested and may be moved by gears, pistons, levers or other actuators which may be operated mechanically, hydraulically or electrically in response to selected input signals. Servo-mechanisms and other feedback arrangements are provided to obtain faster, more accurate and more dependable response of the actuators or the moving platform to the signals.

The table shown in side elevation in FIGURE 1 is illustrative of tables operated in any of the known modes of operation and actuated by any conventional means. For simplicity a movable member 11 is shown resting on a fixed member 12 and the actuating mechanism is not shown. Member 11 is supporting a heavy load 13 to be subjected to a predetermined vibrational pattern. Fluid inlets 14 are shown connected to the upper member 11 for supplying fluid to the contacting surfaces of the two members. The load supporting member 11 consists of an upper plate 16 and lower plate 17 spaced by reinforcing ribs 18. Plate 17 has a plurality of apertures 19 therein communicating with fluid conduits 21 sandwiched between the two plates 16, 17.

Under a heavy load the center of the supporting member will tend to bend under the weight. Thus the center section needs both reinforcing and the lifting force applied thereto. As shown in FIGURE 2 four longitudinal reinforcing ribs and three transverse reinforcing ribs are used, although other designs may be preferable. Here the six inlets 14 are uniformly spaced on either side of the movable member 11 with each inlet connected to a conduit 21 for supplying fluid to a pair of the openings 19. The fluid not only lifts the movable member 11 from contact with the fixed member 12, but also forms a lubricating film therebetween if the fluid is in a liquid state. The lower the coefficient of viscosity of the fluid, the less pressure is needed to force the fluid between the contacting surfaces of the two members, although the lift of the supporting member will not be as high as before the fluid starts to escape. It has been found in a table 24" by 56" that 6 to 8 pounds of air per square inch will lift 1000 pounds sufficiently for substantially friction free movement. With air as the fluid, a lift of from .002 to .005 inch is all that is required so that the quantity of air used during a test is relatively small.

Of course, other fluids may be used such as oil or the hydraulic fluid used in the hydraulic actuation of the table shown symbolically in FIGURE 3. Here movable member 11 is moved by piston rod 23 actuated by hydraulic fluid in cylinder 24. Hydraulic valve 26, in response to input signals, determines the length, direction and frequency of the piston stroke by controlling fluid flow through channels 27, 28 to cylinder 24. Pump 29 pumps the fluid from sump accumulator 31 under proper pressure to valve 26 and channel 32 forms the return path to complete the fluid circulation. Such hydraulic actuation in response to input signals is conventional and known to be old as shown by Patents 2,145,977 issuing Feb. 7, 1939 for Solenoid Actuated Valve to Foster and 2,600,348 issuing June 10, 1952 for Two-Stage Hydraulic Control Valve to Walthers. Thus, valve 26 may typically be actuated by input signals to permit passage of fluid into conduit 27 or into conduit 28 moving piston rod 23 and the piston connected thereto (not shown) to the right or left. The input signal through such valve thereby controls the oscillatory movement of member 11 permitting programming of such movement as desired. As is apparent from an inspection of FIG. 3, conduit 32 serves as a return for fluid passing through lines 27 and 28 when the rod 23 moves to the left or to the right.

A valve 33 connects inlet 14 to the pressurized fluid supply and regulates the pressure and volume of fluid applied to table member 12 for lifting action between members 11 and 12. It has been found that separate valve control for each of the fluid inlets permit different pressures to be utilized to balance the table when the vibrating mass has an unequal weight distribution. Shields 34 prevent splash and direct the surplus fluid to outlet 36 which returns it to the sump accumulator 31 for reuse. Since inlet 14 was connected to member 11 in FIGURE 1, it is shown connected to member 12 in FIGURE 3 to demonstrate that the fluid may pass through either or both members. Moreover, different types of fluid may be used simultaneously if desired.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What I claim is:

1. A fluid actuated vibration table comprising, in combination, a supporting plate having a substantially flat upper surface, a platform movable relative to said plate for supporting a load for vibration, said platform having a substantially flat lower surface positioned above and closely adjacent said supporting plate upper surface, means for effecting said relative movement of said platform, said means comprising a source of pressurized fluid having viscous qualities, actuating means operably connected to said platform for imparting vibratory movement thereto, conduit means connecting said fluid source with said actuating means, valve means governing fluid flow through said conduit means and adapted for response to input signals to thereby control operation of said actuating means and the vibratory movement of said platform, a plurality of conduits in communication with said fluid pressure source terminating in openings distributed over a substantial portion of the upper surface of the supporting plate, said openings serving to direct fluid from said source intermediate said adjacent plate and platform surfaces to create therebetween a substantially continuous fluid film for support of said platform as same is driven in said vibratory movement relative to said supporting plate responsive to operation of said valve-controlled actuating means.

2. A fluid actuated vibration table comprising, in combination, a supporting plate having a substantially flat upper surface, a platform movable relative to said plate for supporting a load for vibration, said platform having a substantially flat lower surface positioned above and closely adjacent said supporting plate upper surface, means for effecting said relative movement of said platform, said means comprising a source of pressurized fluid having viscous qualities, actuating means operably connected to said platform for imparting vibratory movement thereto, conduit means connecting said fluid source with said actuating means, valve means governing fluid flow through said conduit means and adapted for response to input signals to thereby control the operation of said actuating means and the vibratory movement of said platform, a plurality of conduits in communication with said fluid pressure source terminating in openings distributed over a substantial portion of the lower surface of the platform, said openings serving to direct fluid from said source intermediate said adjacent plate and platform surfaces to create therebetween a substantially continuous fluid film for support of said platform as same is driven in said vibratory movment relative to said supporting plate responsive to operation of said valve-controlled actuating means.

3. A fluid actuated vibration table comprising, in combination, a supporting plate having a substantially flat upper surface, a platform movable relative to said plate for supporting a load for vibration, said platform having a substantialy flat lower surface positioned above and closely adjacent said supporting plate upper surface, fluid means for effecting said relative movement of said platform, said means comprising a source of pressurized fluid having viscous qualities, actuating means operably connected to said platform for imparting vibratory movement thereto, fluid conduit means connecting said source with said actuating means, valve means governing fluid flow through said conduit means and adapted for response to input signals to thereby control operation of said actuating means and the vibratory movement of said platform, a plurality of conduits in communication with said fluid pressure source terminating in openings distributed over a substantial portion of the upper surface of the supporting plate, said openings serving to direct fluid from said source intermediate said adjacent plate and platform surfaces to create therebetween a substantially continuous fluid film for support of said platform as same is driven in said vibratory movement relative to said supporting plate responsive to the operation of said valve-controlled actuating means, and means for collecting said film-forming fluid as same escapes peripherally of the platform and plate and for returning said fluid to said pressure source for recirculation.

4. A fluid actuated vibration table comprising, in combination, a supporting plate having a substantially flat upper surface, a platform movable relative to said plate for supporting a load for vibration, said platform having a substantially flat lower surface positioned above and closely adjacent said supporting plate upper surface, fluid means for effecting said relative movement of said platform, said means comprising a source of pressurized fluid having viscous qualities, actuating means operably connected to said platform for imparting vibratory movement thereto, fluid conduit means connecting said source with said actuating means, valve means governing fluid flow through said conduit means and adapted for response to input signals to thereby control operation of said actuating means and the vibratory movement of said platform, a plurality of conduits in communication with said fluid pressure source terminating in openings distributed over a substantial portion of the lower surface of the platform, said openings serving to direct fluid from said source intermediate said adjacent plate and platform surfaces to create therebetween a substantially continuous fluid film for support of said platform as same is driven in said vibratory movement relative to said supporting plate and responsive to the operation of said valve-controlled actuating means, and means for collecting said film-forming fluid as same escapes peripherally of the platform and plate and for returning said fluid to said pressure source for recirculation.

5. A vibration fixture for the vibration testing of apparatus in only a horizontal plane comprising a relatively fixed supporting means having a smooth surface extending in a horizontal plane, an oscillation plate disposed on said surface for movement over said surface, means connected to said oscillation plate whereby it may be reciprocated to vibrate test specimens mounted thereon, and a film of viscous material interposed between said surface and said oscillation plate.

6. A vibration table for vibration testing of a load mounted thereon comprising a relatively fixed base plate having a flat substantially horizontal top surface, a movable plate positioned thereover having a flat substantially horizontal bottom surface adapted for alignment and separable contact with said top surface of said base plate, said movable plate including an upper surface adapted for mounting a load thereon for movement therewith, means for moving said movable plate transversely relative to said base plate in a predetermined manner, and means for supporting said movable plate and an associated load mounted thereon above said base plate in spaced relation therewith to free said movable plate from the resonant frequency effects of said base plate during vibration testing, said supporting means including a plurality of conduits terminating in openings in at least one of the said top and bottom surfaces, said surfaces being otherwise substantially continuous and unbroken, pressurized fluid having viscous qualities, said conduits conveying said pressurized fluid for emission from said openings thereby raising said movable plate into said spaced relation above said base plate to permit fluid leakage between said plates thereby to form a substantially continuous fluid film with said fluid discharging peripherally of the plates.

7. A vibration table for the vibration testing in a horizontal plane of a load of uneven weight distribution comprising, in combination, a relatively fixed lower support member, a movable member having a substantially flat lower surface adjacent to the upper surface of said lower support member, said movable member also having an upper load supporting surface, means operably connected to said movable member for driving same in vibratory movement, pressurized fluid having viscous qualities, inlet means carried by at least one of said members, conduit means communicating with said inlet means and terminating in openings distributed about a surface of said one member, and means for controllably supplying said fluid through said conduit means to said openings at preselected pressures, said fluid being distributed by said openings intermediate said movable member and said lower support member thereby to create a substantially continuous fluid film therebetween and thus effectively balance an associated load being vibrated.

8. A vibration fixture for the vibration testing of apparatus in a horizontal plane comprising a relatively fixed supporting means having a surface extending in a horizontal plane, an oscillation plate disposed for horizontal movement closely adjacent said surface, means connected to said oscillation plate whereby same may be reciprocated to vibrate in only a horizontal plane test specimens mounted theron, and means for providing between said surface and said oscillation plate a film of fluid having viscous qualities.

9. A vibration fixture for the vibration testing of apparatus in a horizontal plane comprising a relatively fixed supporting means having a surface extending in a horizontal plane, an oscillation member disposed for horizontal movement closely adjacent said surface, means connected to said oscillation member whereby said member may be reciprocated to vibrate in only a horizontal plane test specimens mounted thereon, and means operatively connected through said supporting means for providing between said surface and said oscillation member a film of fluid having viscous qualities.

10. A vibration fixture for the vibration testing of apparatus in a horizontal plane comprising a relatively fixed supporting means having a surface extending in a horizontal plane, an oscillation member disposed for horizontal movement closely adjacent said surface, means connected to said oscillation member whereby same may be reciprocated to vibrate in only a horizontal plane test specimens mounted thereon, and means operatively connected through said oscillation member for providing between said surface and said oscillation member a film of fluid having viscous qualities.

11. A vibration fixture for the vibration testing of apparatus in a horizontal plane comprising a relatively fixed supporting means having a surface extending in a horizontal plane, an oscillation member disposed for horizontal movement closely adjacent said surface, means connected to said oscillation member whereby same may be reciprocated to vibrate in only a horizontal plane test specimens mounted thereon, and means including a plurality of openings formed in at least one of said supporting means and said oscillation member from which an oil is emitted to form a film between said surface and said oscillation member.

12. A vibration fixture for the vibration testing of apparatus in only a horizontal plane comprising a relatively fixed supporting means having a smooth surface extending in a horizontal plane, an oscillation plate operably positioned above said surface for movement over said surface, means connected to said oscillation plate for moving it back and forth to vibrate test specimens mounted thereon, and a film of oil interposed between said surface and said oscillation plate.

13. A vibration fixture for the vibration testing of apparatus in only a horizontal plane comprising a relatively fixed supporting means having a smooth surface extending in a horizontal plane, an oscillation member disposed on said surface for movement over said surface, means connected to said oscillation member for moving it back and forth to vibrate test specimens mounted thereon, a film of oil interposed between said surface and said oscillation member, and means for interposing said film of oil.

14. A vibration fixture for the vibration testing of apparatus in only a horizontal plane comprising a relatively fixed supporting means having a smooth surface extending in a horizontal plane, an oscillation member disposed on said surface for movement over said surface, means connected to said oscillation member for moving it back and forth to vibrate test specimens mounted thereon, a film of oil interposed between said surface and said oscillation member, and means for interposing said film including a plurality of openings formed in at least one of said supporting means and oscillation member from which said oil is emitted.

15. A vibration fixture for the vibration testing of apparatus in a horizontal plane comprising a relatively fixed supporting means having a surface extending in a horizontal plane, an oscillation plate disposed for horizontal movement closely adjacent said surface, means connected to said oscillation plate whereby same may be reciprocated to vibrate test specimens mounted thereon, and means for providing between said surface and said oscillation plate a film of oil, said means including a plurality of openings formed in at least one of said supporting means and oscillation plate for emission of said oil to form said film.

References Cited by the Examiner

UNITED STATES PATENTS

| | | | |
|---|---|---|---|
| 775,923 | 11/1904 | Holmes | 308—9 |
| 2,710,234 | 6/1955 | Hansen | 308—9 |
| 2,773,482 | 12/1956 | Dickie | 73—71.6 X |
| 2,788,862 | 4/1957 | Langer | 308—122 X |
| 2,862,385 | 12/1958 | Woods | 73—71.6 |
| 2,877,538 | 3/1959 | Conlon | 308—9 |
| 2,885,915 | 5/1956 | Schurger | 308—9 |

FOREIGN PATENTS 992,803   7/1951   France.

RICHARD C. QUEISSER, *Primary Examiner.*

ROBERT EVANS, C. A. CUTTING, *Examiners.*